Figure 1:
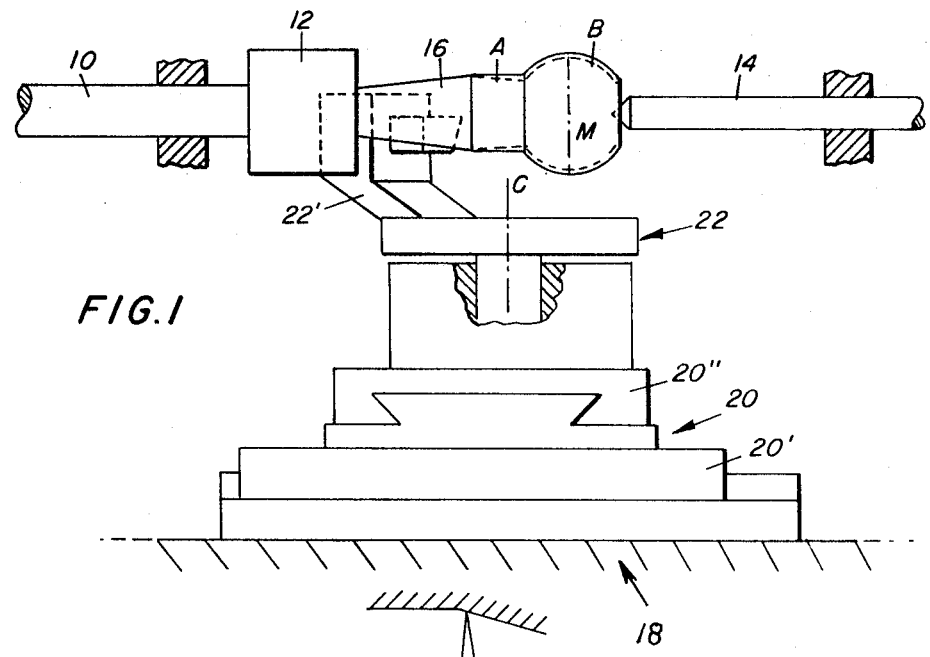

United States Patent

[11] 3,611,845

| [72] | Inventor | Hubert Weidner<br>4991 Dielingen Haus near 78, Germany |
|---|---|---|
| [21] | Appl. No. | 854,159 |
| [22] | Filed | Aug. 29, 1969 |
| [45] | Patented | Oct. 12, 1971 |
| [32] | Priority | Sept. 3, 1968 |
| [33] | | Germany |
| [31] | | P 17 77 084.2 |

[54] METHOD OF MAKING BALL JOINTS
2 Claims, 2 Drawing Figs.

[52] U.S. Cl. .................................................. 82/1 C,
82/11, 82/12
[51] Int. Cl. ..................................................... B23b 1/00
[50] Field of Search .......................................... 82/11, 12,
1.4

[56] References Cited
UNITED STATES PATENTS

| 2,690,532 | 9/1954 | Johnson | 82/11 X |
| 2,720,130 | 10/1955 | Chang | 82/12 X |
| 3,128,657 | 4/1964 | Herbert | 82/11 X |

*Primary Examiner*—Leonidas Vlachos
*Attorney*—Clelle W. Upchurch

ABSTRACT: A method of finishing machining the shaft neck portion and the ball pin blanks on a lathe having a ball turner, wherein the ball turner, which carries the turning tool and is disposed on a slide rest, is first locked in the starting position for the finish machining of the ball and the slide rest is brought into the starting position for the finish machining of the neck portion, after the clamping in of the blank, the neck portion is finish machined with the advance of the slide rest under the control of a first control device, and the slide rest is locked in this end position of the tool, which is at the same time the starting position for the finish machining of the ball, and thereupon the ball turner is unlocked, the ball is finish machined by means of the same tool but with the advance of the ball turner controlled by a second control device, and finally the ball turner and slide rest are returned to their starting position so that the workpiece can be unclamped.

PATENTED OCT 12 1971 3,611,845

INVENTOR
HUBERT WEIDNER

BY *Clells W Zypsonal*
ATTORNEY

METHOD OF MAKING BALL JOINTS

This invention relates to a method of finish machining the shaft neck portion and ball of ball pin blanks on a lathe equipped with a ball turner.

Ball pins which consist of a ball and a shaft attached to the latter are required in large quantities for ball joints in machine, building, motor vehicle construction, precision mechanics and for many other purposes. Such ball pins consist of the ball itself, the adjoining shaft neck portion—both of which parts have to be carefully machined and must have dimensionally accurate surfaces, it being particularly necessary to form the transition between the neck fillet and the ball without any burrs or sharp edges—the tapered part and the threaded or rivet pin portion which adjoin the neck portion in that order. The neck portion, tapered portion and threaded or rivet pin portion form the shaft of the ball pin.

In the production of ball pins, the procedure is that a blank of the ball pin is first manufactured and then the neck portion of the shaft and the ball itself are finish machined. To this end, the threaded pin or rivet pin portion or even the tapered portion is clamped into the chuck of a lathe for rotation thereby and the end nearest the ball is supported, if possible or necessary, by a center which is fitted in the tailstock of the lathe. In the conventional method, a first tool for the machining of the neck portion is guided in a slide rest on the lathe. When the slide rest travels along the bed of the lathe, the movements of the tool are controlled by a first control device, for example by means of a template which is scanned. A ball turner having a second tool for the finish machining of the ball is disposed under the latter and possibly at a slight inclination thereto. The ball turner consists of a tool mounting having a second tool which is rotatable about an axis which in turn is in alignment with the center of the ball to be machined. In the finish machining of the ball, the tool mounting is pivoted, together with the tool, about this axis and is usually controlled by a second control device. The cutting edge of the second tool describes a circular path with a radius which is prescribed by the distance of the point of the tool from the rotational axis of the tool mounting.

The following working processes therefore occur: clamping of the blank and rotation thereof; the two tools in their starting positions for location of their respective working process; finish turning of the neck portion with the first tool and with the slide rest controlled by the first control device, while the second tool initially remains locked, return of the first tool to its starting position and finish turning of the ball by the second tool, controlled by the second control device; return of the second tool to its starting position and locking thereof (naturally, the reverse procedure is also possible); unclamping of the blank.

It is not possible to effect the transition from the neck to the ball without sharp edges, because the surfaces formed by the two different tools intersect at that point.

It is an object of the invention to provide a method for the finish machining of the shaft neck portion of ball pin blanks on a lathe provided with a ball turner, wherein the work cycle is simplified, the setting-up times are reduced, better dimensional accuracy is made possible and a transition from the neck to the ball is achieved which is relatively free from burrs compared with the finished ball pins turned by the above described prior art method.

In accordance with this invention, generally speaking, the foregoing objectives are accomplished by providing a method for finish machining the shaft neck portion and the ball of a ball pin blank which comprises (1) providing a lathe having means for rotating a ball pin blank and a ball-turning device disposed on a slide and carrying a turning tool; (2) moving said turning device to a starting position for the finish machining of the ball portion of the blank and locking the turning device against movement relative to the slide, (3) moving both the turning device and slide while thus locked together to a position for starting the finish machining of the neck portion of the blank, (4) securing a ball pin blank in the means for rotation thereof and rotating the blank, (5) moving the slide under the control of a first control device to finish machine the neck portion of the blank with the turning tool until the tool reaches the starting position for finish machining the ball portion, (6) locking the slide against movement and unlocking the turning device so it can move with respect to the slide, (7) moving the said turning tool over the ball portion of the blank while it is under the control of a second control device to finish machine the ball portion of the blank, 8) returning the slide and ball turning device to its starting position and (9) removing the finished ball pin from the lathe.

When the end position of the slide rest has been reached (after the neck portion has been finish machined), a control signal is transmitted by the first control device to the second control device and triggers the latter so that, for all practical purposes, the tool is not stopped, this makes it possible to achieve a very neat and smooth transition from the neck portion profile to the ball profile.

It will be recognized that, in the first place, the arrangement of the lathe or of the tool mounting is simplified in the method according to the invention, because only one tool is required. Furthermore, a faultless transition of the neck portion profile into that of the ball can be obtained because the tool commences machining of the ball when it reaches the end position of the traverse in which the neck portion is finish machined. Since there is only one tool to be clamped in, the setting up time is reduced; the dimensional accuracy of the neck portion is ensured by the locking position of the ball turner, for which (single) adjustment no precise setting is required.

Figure 2:
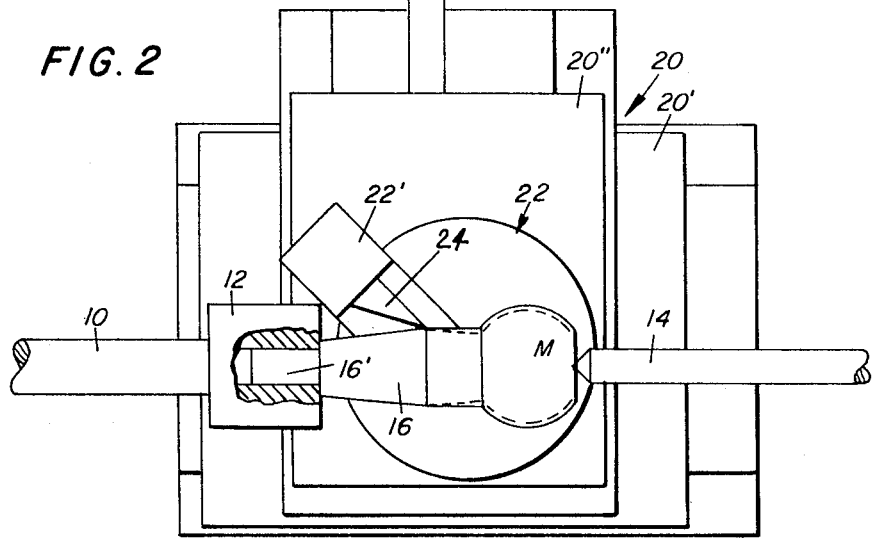

In order that the invention may be more readily understood, reference is made to the accompanying drawing which illustrates diagrammatically and by way of example, one embodiment of apparatus for putting the method of the invention into practice, and in which:

FIG. 1 is a side view of the apparatus; and
FIG. 2 is a plan view.

Ten is the head stock spindle, 12 is the workpiece-clamping device (collet, chuck or the like) and 14 is the center of the tailstock of a lathe. A ball pin blank 16 is clamped in the clamping device 12 by its threaded pin portion or rivet pin portion 16′ and is supported at the end nearest the ball by the center 14. The center is not absolutely necessary in all cases; its presence is governed by the dimensions of the ball pin and by the accuracy desired.

The slide rest 20 is mounted on the bed 18 of the lathe and comprises a longitudinal slide 20′ and a transverse slide 20″. The transverse slide 20″ carries a ball turner 22 with a pivotable tool mounting 22′. A tool 24 is clamped in the latter and rotates about vertical axis "C." FIG. 2 shows diagrammatically a mechanical template control device 26 for the slide rest; that is, the slides 20′ and 20″. For the sake of clarity, the control device for the ball turner 22 is not illustrated. Control devices of this kind are known per se and do not form part of the invention. The combined device may, for example, be a numerical machine tool control system.

The method cycle has been described in detail above; the drawings show the tool and mounting in the starting position for the turning operation of the neck portion of the ball pin blank, after the blank 16 has been clamped in. By means of the control device 26 for the slide 20″, the tool 24 first machines the neck portion of the ball pin 16 during longitudinal and transverse displacement of the slides 20′ and 20″, respectively, so that a profile as shown by the broken line A is obtained. The slide rest, that is to say both the longitudinal and the transverse slides 20′ and 20″, is thereupon locked, the vertical axis C of rotation of the tool mounting 22′ being in alignment with the center point M the ball. The tool 24 then machines the ball profile (broken line B). For the return to the starting position, the tool is guided in the rapid advance condition by the movement of both the slide rest and the ball turner 22.

I claim:

1. A method for finish machining the shaft neck portion and the ball of a ball pin blank which comprises (1) providing a lathe having means for rotating a ball pin blank and a ball-turning device disposed on a slide and carrying a turning tool; (2) moving said turning device to a starting position for the finish machining of the ball portion of the blank and locking the turning device against movement relative to the slide, (3) moving both the turning device and slide while thus locked together to a position for starting the finish machining of the neck portion of the blank, (4) securing a ball pin blank in the means for rotation thereof and rotating the blank, (5) moving the slide under the control of a first control device to finish machine the neck portion of the blank with the turning tool until the tool reaches the starting position for finish machining the ball portion, (6) locking the slide against movement and unlocking the turning device so it can move with respect to the slide, (7) moving the said turning tool over the ball portion of the blank while it is under the control of a second control device to finish machine the ball portion of the blank, (8) returning the slide and ball turning device to its starting position and (9) removing the finished ball pin from the lathe.

2. The method of claim 1 wherein the unlocking of the ball-(turner) turning device and the start of the ball finish machining operation are triggered by a signal which is transmitted by the first control device to the second control device when the end position of the slide rest is reached after the finish machining of the neck portion.